United States Patent
Cleveland

(10) Patent No.: US 7,598,646 B2
(45) Date of Patent: Oct. 6, 2009

(54) ELECTRIC MOTOR WITH HALBACH ARRAYS

(75) Inventor: Mark A. Cleveland, Westminster, CA (US)

(73) Assignee: The Boeing Company, Chicago, IL (US)

( * ) Notice: Subject to any disclaimer, the term of this patent is extended or adjusted under 35 U.S.C. 154(b) by 266 days.

(21) Appl. No.: 11/678,772

(22) Filed: Feb. 26, 2007

(65) Prior Publication Data

US 2008/0224557 A1 Sep. 18, 2008

(51) Int. Cl.
*H02K 21/00* (2006.01)
(52) U.S. Cl. ............... 310/156.43; 310/75 C; 310/180; 310/184
(58) Field of Classification Search ............ 310/67 A, 310/75 C, 156.43, 179–180, 184, 185, 186, 310/206–208; 335/229, 234, 306
See application file for complete search history.

(56) References Cited

U.S. PATENT DOCUMENTS

| | | | |
|---|---|---|---|
| 5,631,618 A | 5/1997 | Trumper et al. | |
| 5,705,902 A * | 1/1998 | Merritt et al. | 318/400.42 |
| 6,278,216 B1 * | 8/2001 | Li | 310/254 |
| 6,841,910 B2 * | 1/2005 | Gery | 310/103 |
| 6,858,962 B2 * | 2/2005 | Post | 310/191 |
| 6,876,284 B2 | 4/2005 | Wright et al. | |
| 6,914,351 B2 | 7/2005 | Chertok | |
| 6,983,701 B2 | 1/2006 | Thornton et al. | |
| 7,031,116 B2 | 4/2006 | Subrahmanyan | |
| 7,053,508 B2 | 5/2006 | Kusase et al. | |
| 7,078,838 B2 * | 7/2006 | Post | 310/90.5 |
| 7,368,838 B2 * | 5/2008 | Binnard et al. | 310/15 |
| 7,462,968 B2 * | 12/2008 | Kusase et al. | 310/75 R |

OTHER PUBLICATIONS

"Inductrack Passive Magnetic Levitation," http://www.skytran.net/press/sciam02.htm, 2003.
"Halbach array," http://en.wikipedia.org/wiki/Halbach_array, Wikipedia, the free encyclopedia, Nov. 7, 2006.

* cited by examiner

*Primary Examiner*—Tran N Nguyen
(74) *Attorney, Agent, or Firm*—Haynes and Boone, LLP

(57) ABSTRACT

Electric motor configurations are provided with Halbach arrays. In one example, an electric motor includes a first plurality of magnets arranged in a first Halbach array. The first plurality of magnets is configured to provide a first magnetic field that substantially exhibits a first Halbach flux distribution. A first plurality of electromagnets comprising a first plurality of coils are arranged in a second Halbach array. A controller is adapted to selectively direct current through the first plurality of coils to induce a second magnetic field to interact with the first magnetic field. The second magnetic field substantially exhibits a second Halbach flux distribution.

11 Claims, 6 Drawing Sheets

US 7,598,646 B2

ELECTRIC MOTOR WITH HALBACH ARRAYS

TECHNICAL FIELD

The present disclosure relates generally to electric motors.

BACKGROUND

Conventional electric motors typically rely on the interaction of magnetic fields provided by electromagnets or permanent magnets. In this regard, the attractive and repulsive forces of such magnetic fields may be used to provide mechanical motion.

However, the magnetic field strength available from conventional electromagnets and permanent magnets grows significantly weaker over very short distances. As a result, the distances between magnets of opposing or attracting magnetic fields in conventional electric motors are generally kept very small in order to provide sufficient magnetic field strength for mechanical applications. For example, typical air gaps for small brushless DC motors may range from about 0.005 to 0.015 inches.

Unfortunately, such requirements can negatively impact the design of electric motors. For example, because of the need to maintain relatively tight tolerances between magnets, conventional electric motors are generally ill-suited for harsh environments where dust or sand may become lodged between, for example, rotor and stator members of the motor.

One approach to increasing magnetic field strength is the use of iron-cored electromagnets. Because iron cores can reinforce the magnetic fields produced by coil windings of electromagnets, greater distances can be provided between magnets. However, such iron cores can significantly increase the weight of electric motors. This increased weight can seriously compromise the usefulness of such motors, especially in environments where weight savings is at a premium such as in electric motors included in space-bound payloads.

Accordingly, there is a need for an improved approach to electric motor design that permits gaps between magnets and inductors to be increased. Moreover, there is a need to provide such gaps without unduly increasing the weight of electric motors.

SUMMARY

In accordance with one embodiment of the present disclosure, an electric motor includes a first plurality of magnets arranged in a first Halbach array, wherein the first plurality of magnets is configured to provide a first magnetic field that substantially exhibits a first Halbach flux distribution; a first plurality of electromagnets comprising a first plurality of coils arranged in a second Halbach array; and a controller adapted to selectively direct current through the first plurality of coils to induce a second magnetic field to interact with the first magnetic field, wherein the second magnetic field substantially exhibits a second Halbach flux distribution.

In accordance with another embodiment of the present disclosure, a method of operating an electric motor includes providing a first magnetic field from a first plurality of magnets arranged in a first Halbach array, wherein the first magnetic field substantially exhibits a first Halbach flux distribution; and selectively directing current through a first plurality of coils of a first plurality of electromagnets arranged in a second Halbach array to induce a second magnetic field to interact with the first magnetic field, wherein the second magnetic field substantially exhibits a second Halbach flux distribution.

In accordance with another embodiment of the present disclosure, an electric motor includes a rotor; means for providing a first magnetic field directed from a first side of the rotor, wherein the first magnetic field substantially exhibits a first Halbach flux distribution; and means for selectively inducing a second magnetic field directed toward the first side of the rotor to interact with the first magnetic field, wherein the second magnetic field substantially exhibits a second Halbach flux distribution, wherein the rotor is adapted to rotate in response to interaction between the first and second magnetic fields.

The scope of this disclosure is defined by the claims, which are incorporated into this section by reference. A more complete understanding of embodiments of the present disclosure will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

In accordance with various embodiments of this disclosure, magnets configured in Halbach arrays may be used to provide magnetic fields for use in electric motors. The use of such Halbach arrays can provide a high flux density in gaps between the Halbach arrays to permit large gaps to be introduced between magnets of electric motors while maintaining a reasonable efficiency. The flux density in such gaps may be further enhanced as a function of armature power. By matching the flux densities of the Halbach arrays with each other, efficient power transfer may be accomplished.

Figure 1:
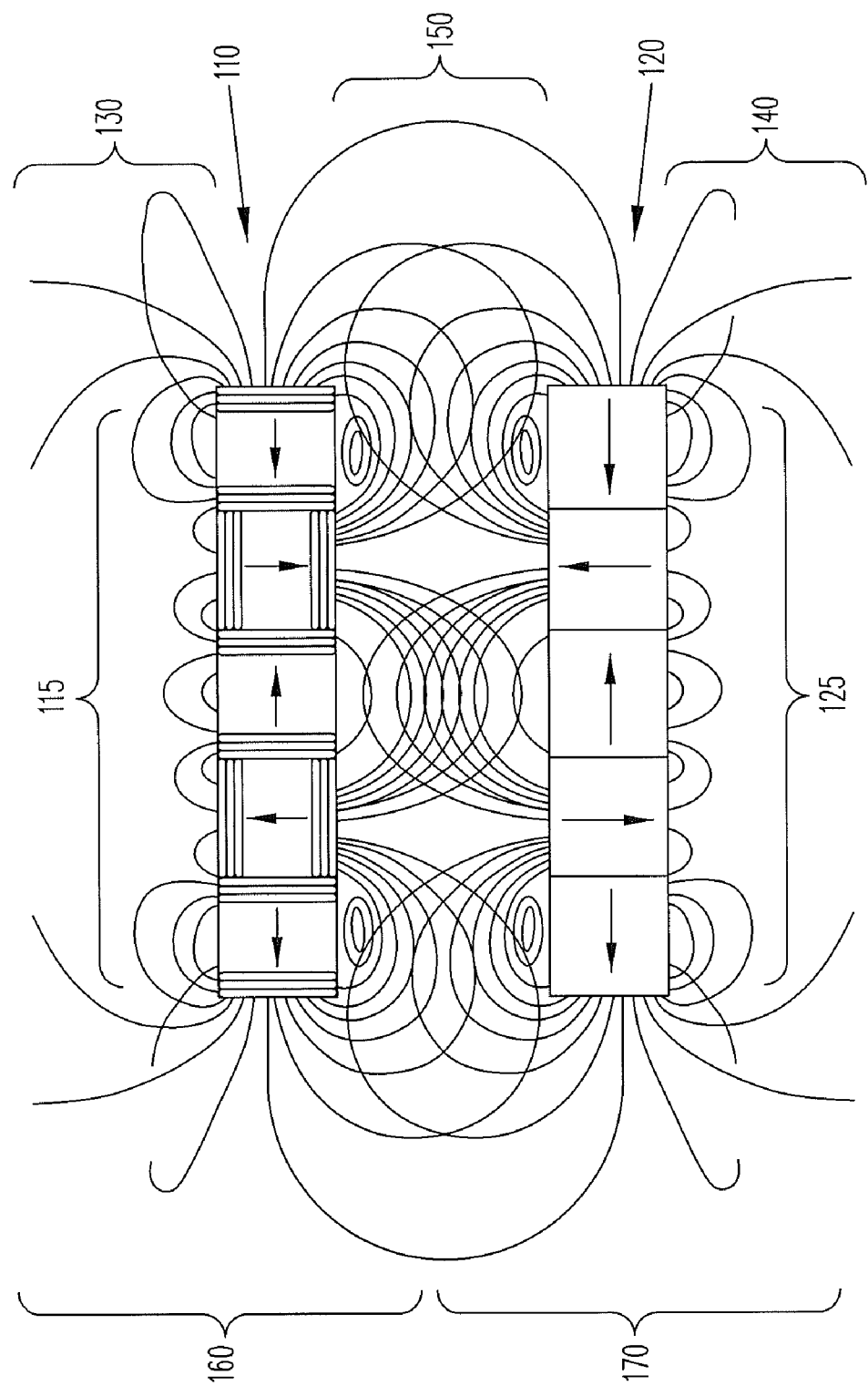
FIG. 1 illustrates a plurality of magnets implemented as two Halbach arrays in accordance with an embodiment of this disclosure.

FIG. 1 illustrates a plurality of magnets implemented as two Halbach arrays 110 and 120 in accordance with an embodiment of this disclosure. In particular, Halbach array 110 is implemented by a plurality of electromagnets 115 exhibiting a magnetic field denoted by flux lines 160. As shown, electromagnets 115 may be implemented with coils that exhibit magnetic fields with orientations indicated by the arrows illustrated in FIG. 1 for each electromagnet 115. It will be appreciated that electromagnets 115 exhibit a Halbach array configuration (e.g., the orientation of electromagnets 115 change in a ninety degree counterclockwise fashion from left to right). As a result, flux lines 160 corresponding to the magnetic field provided by electromagnets 115 may exhibit a Halbach flux distribution. In this regard, the magnetic field provided by electromagnets 115 is highly concentrated in a region 150 on a front side of Halbach array 110 as illustrated by flux lines 160. In addition, the magnetic field is significantly reduced in a region 130 on a back side of Halbach array 110 as also illustrated by flux lines 160.

Halbach array 120 is implemented by a plurality of permanent magnets 125 exhibiting a magnetic field denoted by flux lines 170. As also shown in FIG. 1, permanent magnets 125 may be implemented with magnetic field orientations indicated by the arrows illustrated in FIG. 1 for each permanent magnet 125. Accordingly, it will be appreciated that permanent magnets 125 exhibit a Halbach array configuration complementary to that of electromagnets 115 (e.g., the orientation of permanent magnets 125 change in a clockwise ninety degree fashion from left to right). As a result, flux lines 170 corresponding to the magnetic field provided by permanent magnets 125 may also exhibit a Halbach flux distribution. In this regard, the magnetic field provided by permanent magnets 125 is highly concentrated in a region 150 on a front side of Halbach array 120 as illustrated by flux lines 170. In addition, the magnetic field is significantly reduced in a region 140 on a back side of Halbach array 120 as also illustrated by flux lines 170.

It will be appreciated that, taken together, Halbach arrays 110 and 120 provide a high concentration of opposing or attracting magnetic flux lines 160 and 170 in region 150. In accordance with various embodiments further described herein, such a configuration may permit a large gap (e.g., a large air gap or large vacuum gap) to be provided between components of an electric motor.

Although FIG. 1 illustrates one possible configuration of Halbach arrays which may be used to provide a region of highly concentrated opposing or attracting magnetic fields having Halbach flux distributions, other configurations are also contemplated. For example, FIGS. 2A and 2B illustrate various Halbach array configurations in accordance with embodiments of this disclosure.

Figure 2:
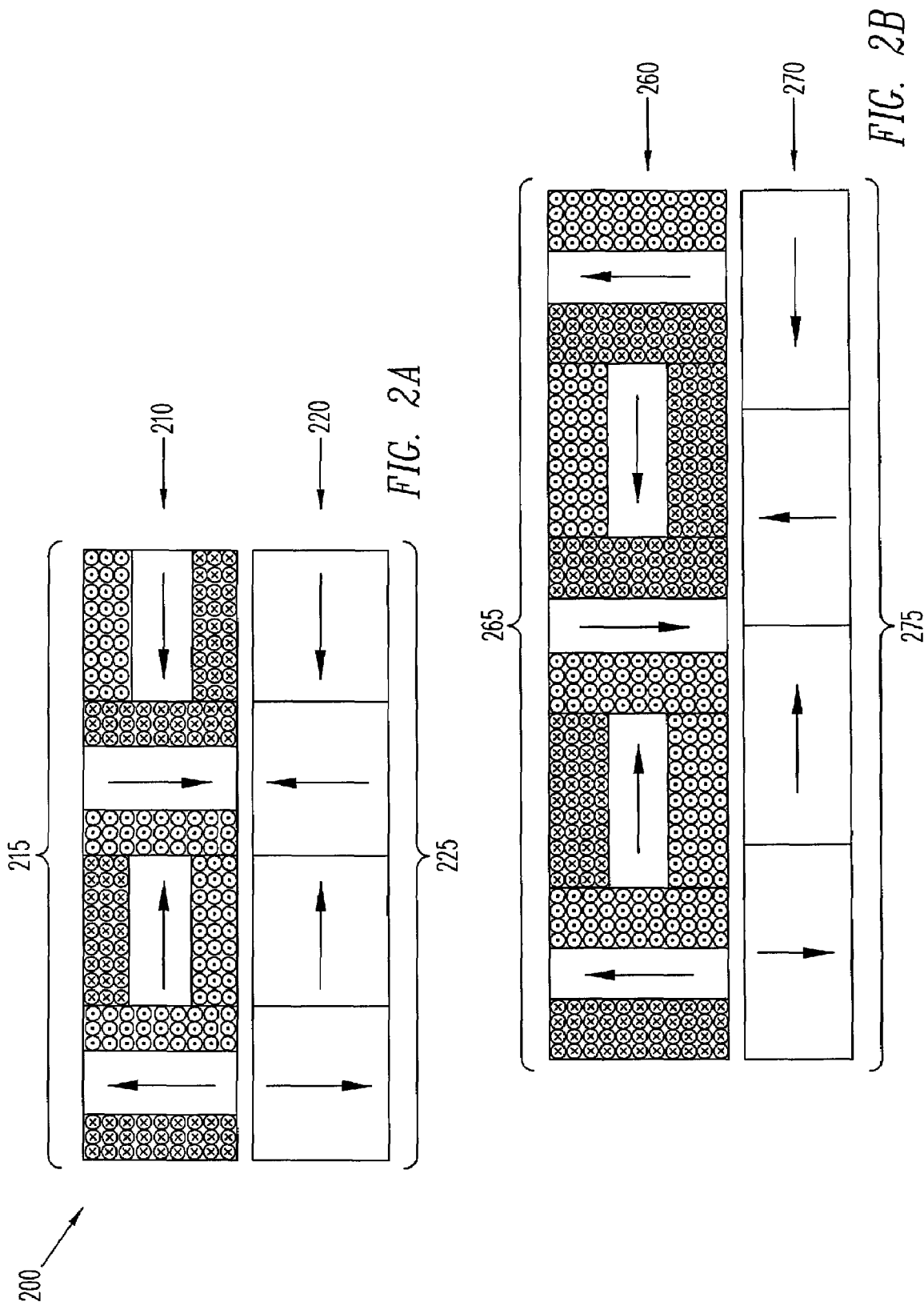
FIGS. 2A and 2B illustrate various Halbach array configurations in accordance with embodiments of this disclosure.

In particular, FIG. 2A illustrates a configuration 200 with a Halbach array 210 of four electromagnets 215 and a Halbach array 220 of four permanent magnets 225. Accordingly, in the configuration of FIG. 2A, electromagnets 215 and permanent magnets 225 exhibit a ratio of 1:1 to each other.

FIG. 2B illustrates a configuration 250 with a Halbach array 260 of five electromagnets 265 and a Halbach array 270 of four permanent magnets 275. Accordingly, in the configuration of FIG. 2B, electromagnets 265 and permanent magnets 275 exhibit a ratio of 5:4 to each other.

It will be appreciated that the direction and orientation of coils of electromagnets 215 and 265, respectively, are also illustrated in FIGS. 2A and 2B, respectively. In various embodiments, any of electromagnets 115, 215, or 265 of FIGS. 1, 2A, or 2B, respectively may be implemented as coreless or semi-coreless (e.g., iron-cored) electromagnets. Also, in various embodiments, any of permanent magnets 125, 225, or 275 of FIGS. 1, 2A, or 2B, respectively may be replaced with appropriate electromagnets if desired.

Figure 3:
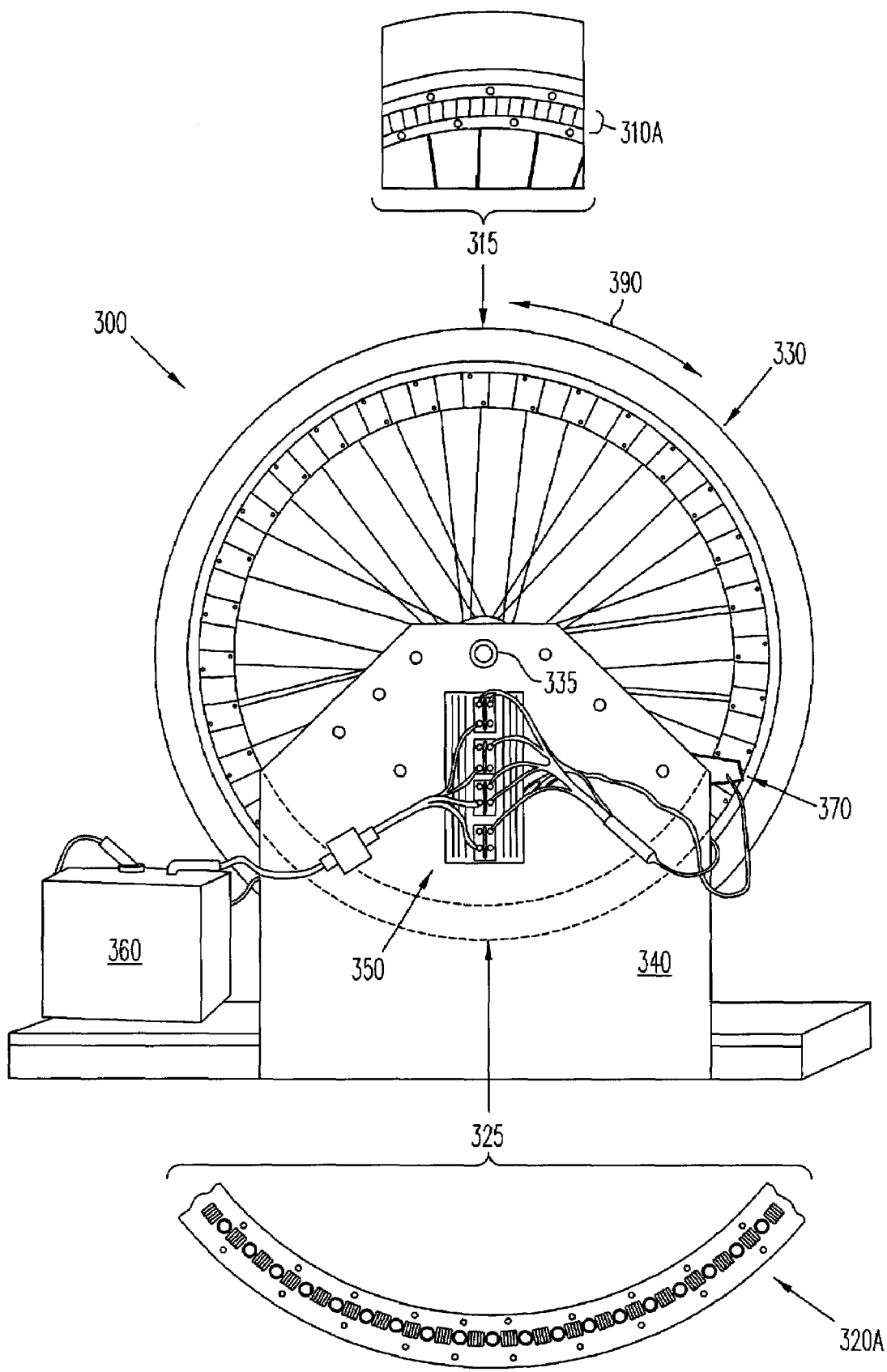
FIG. 3 illustrates a side view of an electric motor in accordance with an embodiment of this disclosure.
Figure 4A:
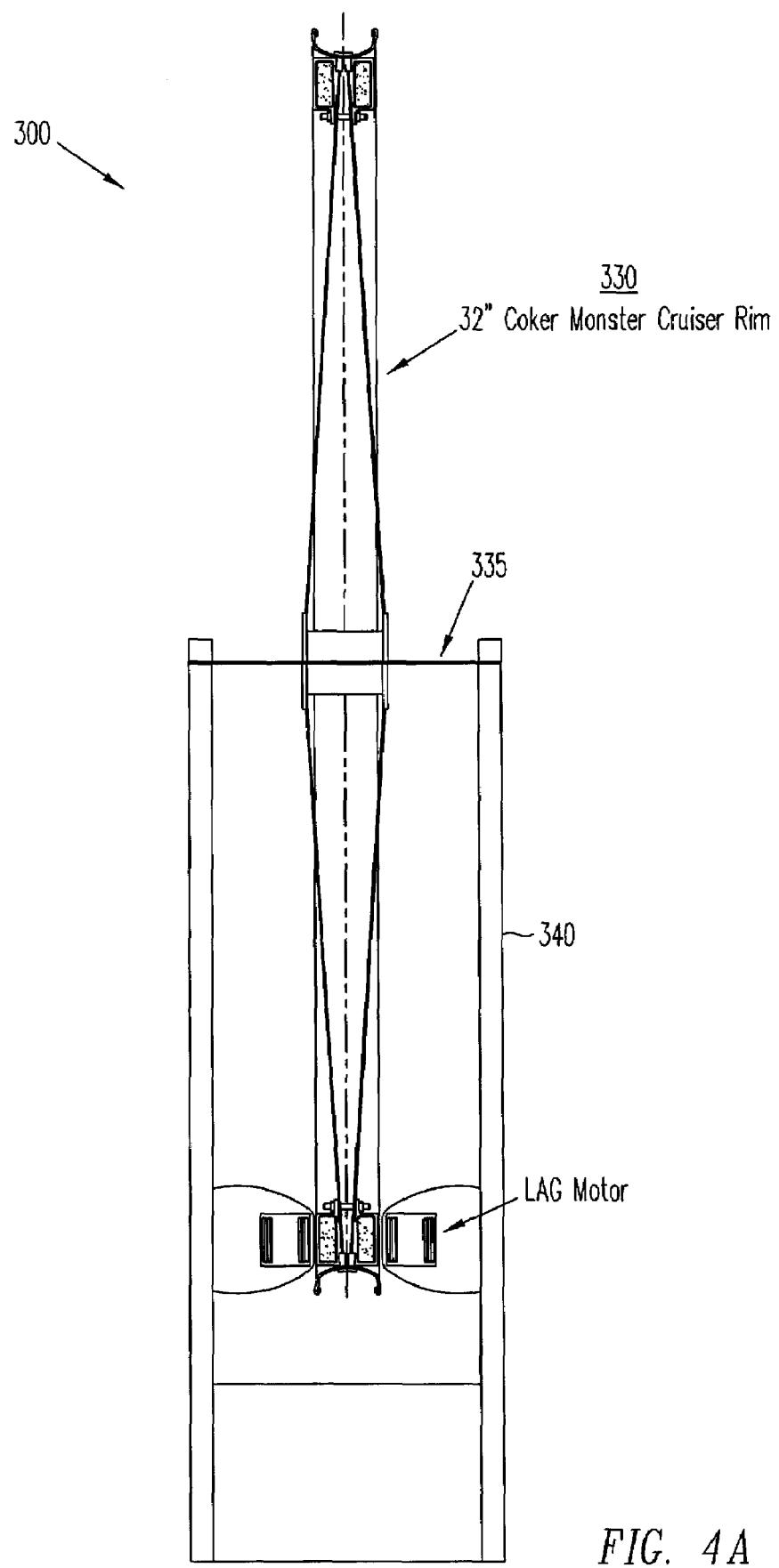
FIGS. 4A and 4B illustrate cross-sectional views of the electric motor of FIG. 3 in accordance with an embodiment of this disclosure.
Figure 4B:
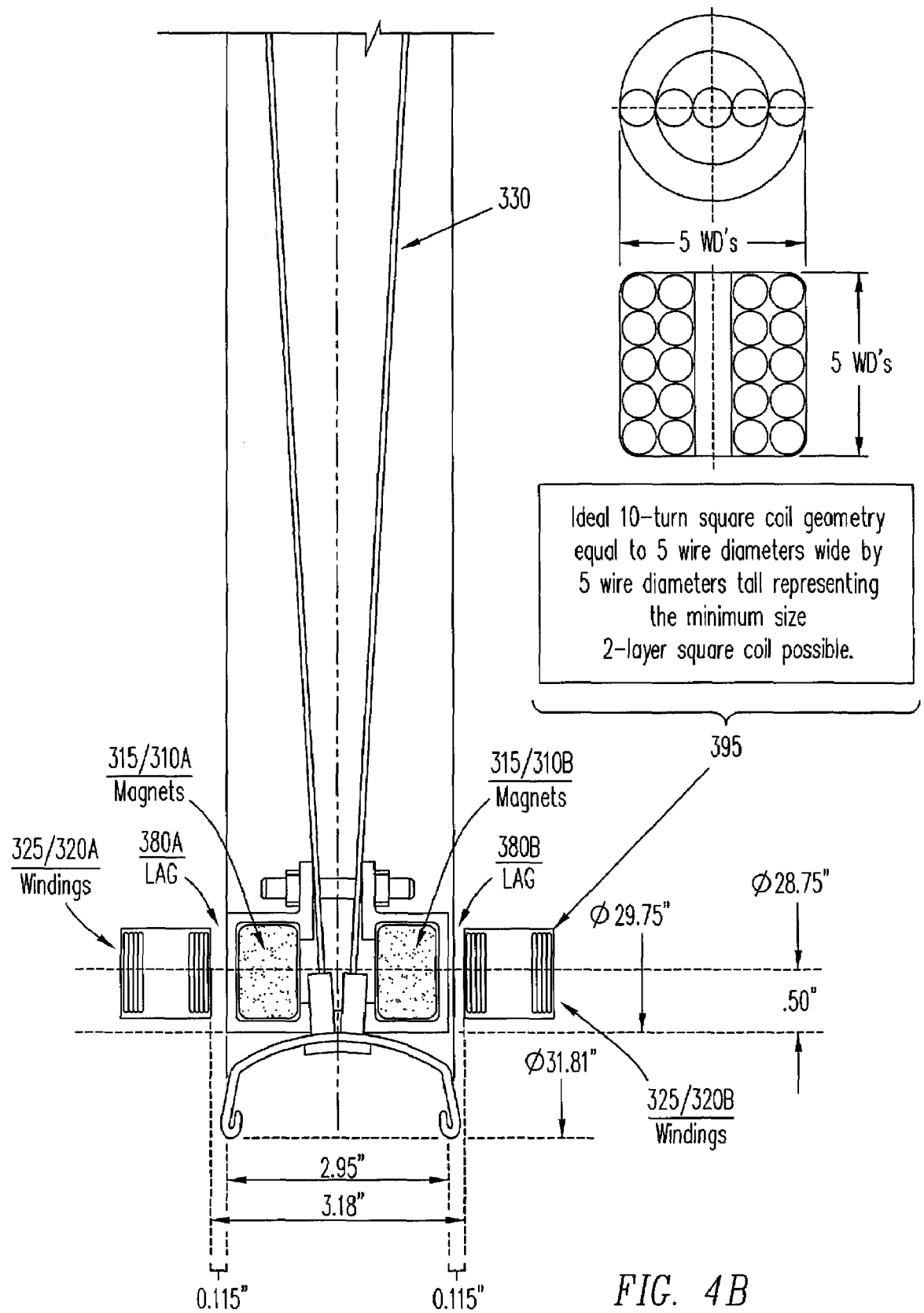

FIG. 3 illustrates a side view of an electric motor 300 in accordance with an embodiment of this disclosure. FIGS. 4A and 4B illustrate cross-sectional views of the electric motor of FIG. 3 in accordance with embodiments of this disclosure.

As shown, electric motor 300 includes a rotor implemented as a wheel 330 having an axle 335 mounted to a housing 340. Accordingly, it will be appreciated that axle 335 may permit wheel 330 to be rotated relative to housing 340 for example, in clockwise or counterclockwise directions denoted by arrows 390. A plurality of permanent magnets 315 configured to implement Halbach arrays 310A and 310B are disposed substantially along a periphery of each side of wheel 330.

Halbach arrays 310A and 310B may be implemented in accordance with any desired number of whole or partial instances of the configurations previously described herein with respect to Halbach arrays 120, 220, or 270. Optionally, electric motor 330 may be implemented with only one of Halbach arrays 310A or 310B positioned on only one side of wheel 330 if desired.

Electric motor 300 further includes a plurality of electromagnet coils 325 which may be connected together to provide one or more windings configured to implement electromagnets for Halbach arrays 320A and 320B. For example, in one embodiment, a winding to provide Halbach array 320A may be disposed on one inside surface of housing 340, and another winding to provide Halbach array 320B may be disposed on another inside surface of housing 340.

In various embodiments, magnets 315 may be spaced about wheel 330 to match the spacing of coils 325 (for example, corresponding to the configuration of FIG. 2A) or with different spacing (for example, corresponding to the configuration of FIG. 2B). For example, in the embodiments illustrated in FIGS. 3 and 4A-B, 216 grade N50 (MGoe) magnets 315 may be provided on each side of wheel 330 (e.g., a total of 432 magnets 315) to provide 108 Halbach arrays (216 poles) on a centerline of approximately 28.75" diameter. In this embodiment, the arc length of magnets 315 is approximately 0.42 inches on the same centerline. However, it will be appreciated that the various specifications set forth herein are provided for purposes of example and not limitation.

In one embodiment, each winding of electromagnet coils 325 may be implemented to exhibit a resistance less than approximately 0.075 ohms per winding. The operating current of each winding may be implemented in accordance with the heat dissipation available for each winding. For example, electromagnet coils 325 may exhibit heat dissipation of less than approximately 0.50 watts/in^2.

Electromagnet coils 325 may be implemented with wire of any desired thickness. For example, in the embodiments illustrated in FIGS. 3 and 4A-B, electromagnet coils 325 are implemented with 14 awg wire. However, it is contemplated that larger wire gauges (for example, 4 awg) may also be used. In one embodiment, each electromagnet coil 325 is implemented with an inner diameter of approximately 0.16 inches, an outer diameter of approximately 0.42 inches, and a length of approximately 0.42 inches long.

Electromagnet coils 325 may be wound to form a square coil geometry where the diameter equals the length which allows the coils to be rotated into positions to form Halbach arrays 320A and 320B. In one embodiment, the number of turns per length of wire may be maximized by winding coils 325 around the smallest diameter possible in two layers. Each additional layer may be wound at a larger diameter using a longer length of wire to make each successive turn of coils 325.

In another embodiment illustrated as configuration 395 in FIG. 4B, coils 325 may be wound in two layers whereby both ends of the wire are terminated on the same end of the coil making for a "neat" Halbach array winding. The smallest possible 2-layer coil geometry is obtained when the inner diameter of the coil is equal to the wire diameter being used. Configuration 395 illustrates an example of such a configuration having an outer diameter equal to 5 times the wire diameter, and 5 rows in length to form a square coil geometry.

In one embodiment, each of Halbach arrays 320A and 320B includes 53 individual electromagnet coils 315 connected in series for a total of 106 electromagnet coils 315 used by electric motor 300. In such an embodiment, electromagnet coils 325 may be implemented with 2 layers and 5 rows each for a total of 10 turns per electromagnet coil 325 to implement 1060 turns in electric motor 300 (10 turns per coil×106 coils=1060 turns).

In the embodiments illustrated in FIGS. 3 and 4A-B, electromagnet coils 325 are connected in series. However, other implementations are also contemplated. For example, in one embodiment, subsets of electromagnet coils 325 may be connected with each other in parallel.

Halbach arrays 320A and 320B may be implemented in accordance with any desired number of whole or partial instances of the configurations previously described herein with respect to Halbach arrays 110, 210, or 260. Optionally, electric motor 330 may be implemented with only one of Halbach arrays 320A or 320B (for example, where only one of Halbach arrays 310A or 310B is provided).

Electric motor 300 further includes a power supply 360, one or more sense coils 370, one or more power semiconductors such as MOSFETs 350, and additional circuitry as further described herein. In the embodiments shown in FIGS. 3 and 4A-B, power supply 360 may be implemented by any appropriate power source such as a battery. For example, in various embodiments, a battery used for power supply 360 may be implemented with any desired voltage (e.g., approximately 6V through 92V, and other voltages). However, it will be appreciated that power supply 360 may alternatively be implemented as any desired type of power source.

As also shown in FIGS. 4A-B, electric motor 300 may provide a gap 380A between Halbach arrays 310A and 320A, and a gap 380B between Halbach arrays 310B and 320B. For example, as shown in the embodiment of FIGS. 4A-B, internal surfaces of Halbach arrays 320A and 320B may be separated by a distance of approximately 3.18 inches, and external surfaces of Halbach arrays 310A and 310B may be separated by a distance of approximately 2.95 inches, wherein in each of gaps 380A and 380B corresponds to approximately 0.115 inches ((3.18 inches−2.95 inches)/2=0.11 inches). In another embodiment, gaps 380A and 380B may be even larger. For example, gaps up to approximately 3.0 inches may be used.

The size of gaps 380A and 380B may be selected by matching exciting current and machine reactances between Halbach arrays 310A and 320A, and between Halbach arrays 310B and 320B. For example, if Halbach arrays 320A and 320B are excited with a current of 60 A to provide up to approximately 500 gauss at the center of each of gaps 380A and 380B, then magnets 310A and 310B may be implemented to provide a matching flux density of approximately 500 gauss.

In this case, Halbach arrays 320A and 320B may provide an expected peak magnetic field of approximately 800 gauss at the center of their windings. In this embodiment, Halbach arrays 320A and 320B may each be implemented with a winding thickness of approximately 0.43 inches. The center of Halbach arrays 320A and 320B may be located about 0.33 inches from the surface of magnets 310A and 310B. This 0.33 inches includes gaps 380A and 380B (implemented in this embodiment as 0.115 inches each) plus one half of the winding thickness of Halbach arrays 320A and 320B (implemented in this embodiment as 0.215 inches). Because magnetic flux attenuates exponentially, magnets 310A and 310B in this embodiment may be sized with a high flux density of approximately 12,000 gauss at their surfaces to provide a matching flux density of approximately 500 gauss in the center of each of gaps 380A and 380B.

Figure 5:
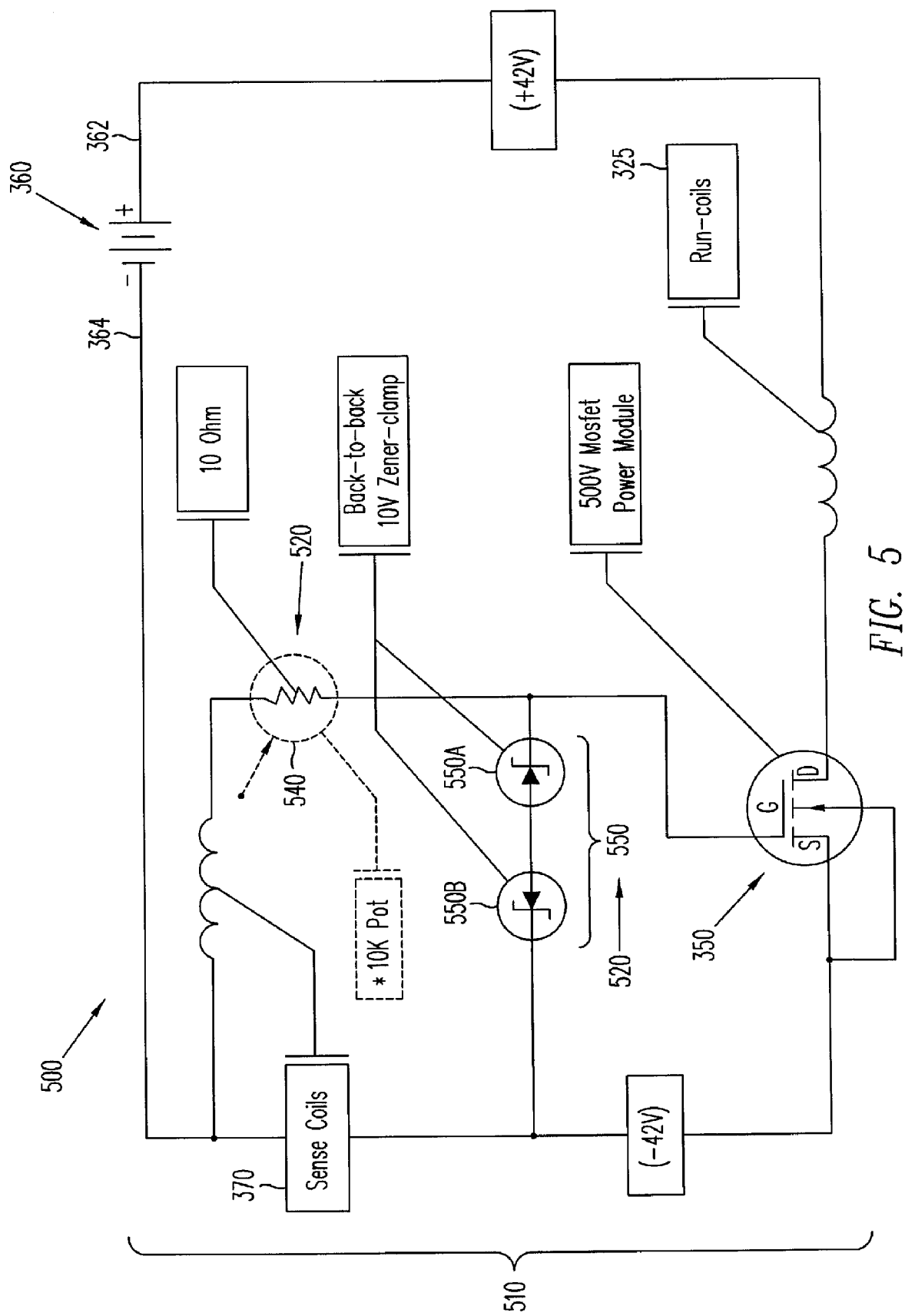
FIG. 5 illustrates a schematic diagram of an electric motor in accordance with an embodiment of this disclosure.

FIG. 5 illustrates a schematic diagram of a circuit 500 of electric motor 300 in accordance with an embodiment of this disclosure. In various embodiments, portions of circuit 500 may be implemented as a controller configured to selectively direct current through coils 325 in accordance with various techniques described herein. As shown in FIG. 5, circuit 500 includes a main circuit 510 and a protection circuit 520.

Main circuit 510 includes electromagnet coils 325 (also referred to as run-coils), MOSFET 350, power source 360 (here, implemented as a battery), and one or more sense coils 370. For purposes of illustration, only a single MOSFET 350 is shown in FIG. 5. However, it will be appreciated that a plurality of MOSFETs 350 (for example, four MOSFETS 350) may be provided and wired in parallel with each other. It will also be appreciated that circuit 500 may include only some or all of electromagnet coils 325 and sense coils 370. For example, it is contemplated that a single instance of circuit 500 may be used in connection with all electromagnet coils 325 and sense coils 370 of electric motor 300. However, it is also contemplated that additional instances of some or all portions of circuit 500 may be used in connection with different sets electromagnet coils 325 and sense coils 370 of electric motor 300 (e.g., a first set of electromagnet coils 325 and sense coils 370 on one side of wheel 330 and a second set of electromagnet coils 325 and sense coils on another side of wheel 330). Protection circuit 520 includes a resistor 540 and Zener diodes 550.

The operation of electric motor 300 for use in turning wheel 330 will now be described with reference to various figures of the present disclosure. In the following example, it will be assumed that wheel 330 is already rotating in a clockwise direction relative to housing 340. In this regard, it will be appreciated that a force may be initially applied to wheel 330 in order begin such rotation. For example, such force may be provided by a separate motor controller (not shown) or other force-inducing approach different from electric motor 300, such as a starter motor. It will also be appreciated that although a clockwise direction will be further described below, the operating principles of electric motor 300 may be similarly applied to a counterclockwise direction.

As wheel 330 rotates in a clockwise direction, permanent magnets 315 of Halbach arrays 310A and 310B will likewise rotate in a clockwise direction. Specifically, permanent magnets 315 will rotate past stationary sense coils 370 as well as stationary electromagnet coils 325 of Halbach arrays 320A and 320B. It will be appreciated that as permanent magnets 315 rotate past sense coils 370, a current will be induced in sense coils 370 due to Lorentz forces induced in sense coils 370 by the magnetic field of Halbach arrays 310A and 310B. In one embodiment, such current may increase and decrease as each of magnets 315 passes by sense coils 370. For example, in this embodiment, such current may be greatest when a center portion of each of magnets 315 is directly adjacent to sense coils 370.

Referring to main circuit 510 of FIG. 5, it will be appreciated that current induced in sense coils 370 will cause the voltage to rise at the gate of MOSFET 350. If the gate voltage rises above the threshold voltage of MOSFET 350, then MOSFET 350 will turn on, thereby allowing current to flow from node 362 to node 364 through electromagnet coils 325 and MOSFET 350. The current flow through electromagnet coils 325 will induce a corresponding magnetic field from Halbach arrays 320A and 320B. Accordingly, as each of magnets 315 passes by sense coils 370, MOSFET 350 can be selectively turned on and off (e.g., pulsed) in response to the voltage changes at its gate caused by the variations in current flow caused by each of magnets 315 passing by sense coils 370. In another embodiment, the gate of MOSFET 350 may be triggered by a function generator (not shown) which may be configured to provide a pulse signal to the gate. In such an embodiment, the function generator may be powered, for example, by power source 360.

Halbach arrays 310A-B and 320A-B may be configured to provide opposing or attracting magnetic fields in relation to each other. Accordingly, it will be appreciated that as MOSFET 350 is pulsed in response to the rotation of magnets 315, Halbach arrays 320A-B can induce an opposing or attracting magnetic fields toward Halbach arrays 310A-B. The interaction of the opposing or attracting magnetic fields of Halbach arrays 310A-B and 320A-B can therefore reinforce the rotation of wheel 330. As a result, electric motor 300 can force wheel 330 to continue rotating.

In one embodiment, MOSFET 350 may be triggered at top-dead-center of the opposing or attracting corresponding magnetic fields of adjacent Halbach arrays 310A/320A and 310B/320B. The timing of this trigger may be adjusted by changing the position of sense coils 370. By advancing or retarding the timing, the efficiency of electric motor 300 may be changed. In embodiments where such advancement or retardation reduces efficiency, electromagnet coils 325 of Halbach arrays 320A-B and permanent magnets 315 of Halbach arrays 310A-B may be implemented with a ratio of 5:4 to each other. In this case, efficiency lost as a result of timing changes can be directed towards levitation or attraction forces in the interaction between Halbach arrays 310A-B and 320A-B. By combining a magnetic/electromagnetic mismatch into a single armature by design, a levitated rotor while maintaining a part load is possible.

Referring to protection circuit 520, Zener diodes 550 may be implemented in a back-to-back configuration to limit the voltage provided to the gate of MOSFET 350 from sense coil 370 and back EMF from the windings of electromagnet coils 325. In this regard, it will be appreciated that if the voltage across sense coils 370 reaches the breakdown voltage and forward bias voltage of Zener diodes 550A and 550B, respectively, then further current induced in sense coils 370 by the rotation of magnets 315 will be shunted by Zener diodes 550 and therefore will not cause a significant increase in voltage at the gate of MOSFET 350. As also shown in FIG. 5, protection circuit 520 includes resistor 540. Resistor 540 may be implemented, for example, as a potentiometer.

In view of the present disclosure, it will be appreciated that an electric motor in accordance with various embodiments disclosed herein can be used to facilitate motion in a variety of different applications. For example, various embodiments of electric motor 300 may be used to rotate vehicle wheels to provide translational motion during rotation, aircraft rotors to provide vertical lift during rotation, and other apparatus.

Moreover, because of the large gaps which may be implemented between Halbach arrays 310A-B and 320A-B, electric motor 300 may be particularly well suited for use in environments where dust and other particulate may be present, such as in desert, lunar, or other hostile environments. Moreover, because various embodiments of electric motor 330 can be rim-driven (i.e., Halbach arrays 310A-B and 320A-B may be configured to exert forces in proximity to a peripheral portion of wheel 330), such embodiments can advantageously provide high levels of torque.

For example, in space exploration surface mobility vehicle applications, gaps 380A-B can reduce the negative effects that planetary dust can have on rotating surfaces and eliminates the transmission or gearing as well. The large diameter of the coreless rim driven motor also provides a distinct discriminator in the form of a torque-advantage over smaller diameter motors reducing the battery capacity required for a given roving mission. The larger the diameter of the motor, the less current will be required to respond to a given torque demand. For wind energy harvesting, gaps 380A-B combined with a rim-driven rotor can be used to provide an efficient low wind speed generator.

It will be appreciated that the various configurations described herein may be applied to many different types of electrical machines in the form of rotary, linear, and oscillatory resonant motors and generators. For example, in one embodiment, electric motor 300 may be implemented as a lightweight large diameter rim driven brushless dc motor or generator that is integrated into the body of an electric vehicle. In another embodiment, various aspects of the present disclosure may also be applied to linear motion using, for example, the linear magnet configurations illustrated in FIGS. 1 and 2A-B.

In another embodiment, electric motor 300 may be integrated into the construction of an aerial or surface mobility system without the traditional use of metal components. For example, gaps 380A-B between Halbach arrays 310A-B and 320A-B can allow passive magnets 315 to be imbedded into a composite lay-up and co-cured at normal autoclave pressures and temperatures up to 500° F. Active components such as electromagnet coils 325 and other circuitry may be packaged separately and integrated into another part of a vehicle as to be hermetically sealed from the environment. This flexibility in vehicle architecture can in turn allow optimization of the vehicle design thereby minimizing overall weight impact or "scar weight" in any given advanced platform system.

As previously described, gaps 380A and 380B may be implemented with large dimensions such as, for example, up to approximately 3.0 inches. In such embodiments, this increased distance between Halbach arrays 310A and 320A, and between Halbach arrays 310B and 320B can reduce the efficiency of electric motor 300. However, such embodiments can nevertheless be useful in applications where efficiency is less important. For example, it is contemplated that such embodiments may be used where one or more rotors of an unmanned aerial vehicle (UAV) utilizing electric motor 300 may be pre-spun (for example, up to several thousand revolutions per minute) using a ground power source such as a battery or direct power connection. In this case, the stored rotational energy in the rotors could then be used to rapidly lift the UAV to adequate surveillance altitudes (for example, several hundred feet) without requiring electric motor 300 to expend its on-board power source to provide such initial vertical lift, thereby permitting the on-board power source to be retained for extended aerial mobility missions.

Embodiments described above illustrate but do not limit this disclosure. It should also be understood that numerous modifications and variations are possible in accordance with the principles of the present disclosure. Accordingly, the scope of this disclosure is defined only by the following claims.

I claim:
1. An electric motor comprising:
 a first plurality of magnets arranged in a first Halbach array, wherein the first plurality of magnets is configured to provide a first magnetic field that substantially exhibits a first Halbach flux distribution;
 a first plurality of electromagnets comprising a first plurality of coils arranged in a second Halbach array; and
 a controller adapted to selectively direct current through the first plurality of coils to induce a second magnetic field to interact with the first magnetic field, wherein the second magnetic field substantially exhibits a second Halbach flux distribution.

2. The electric motor of claim 1, wherein the first plurality of electromagnets and the first plurality of magnets exhibit a ratio of approximately 1:1 to each other.

3. The electric motor of claim 1, wherein the first plurality of electromagnets and the first plurality of magnets exhibit a ratio of approximately 5:4 to each other.

4. The electric motor of claim 1, wherein the first plurality of electromagnets are coreless electromagnets and wherein the first plurality of magnets are permanent magnets.

5. The electric motor of claim 1, wherein the first plurality of magnets are electromagnets.

6. The electric motor of claim 1, further comprising a rotor, wherein the first plurality of magnets are disposed substantially along a periphery of a first side of the rotor, wherein the rotor is adapted to rotate in response to interaction between the first and second magnetic fields.

7. The electric motor of claim 6, wherein the rotor is a wheel configured to provide translational motion during rotation.

8. The electric motor of claim 6, wherein the rotor is adapted to provide substantially vertical lift during rotation.

9. The electric motor of claim 6, further comprising:
a second plurality of magnets arranged in a third Halbach array disposed substantially along a periphery of a second side of the rotor, wherein the third plurality of magnets is configured to provide a third magnetic field that substantially exhibits a third Halbach flux distribution;
a second plurality of electromagnets comprising a second plurality of coils arranged in a fourth Halbach array, wherein the controller is further adapted to selectively direct current through the second plurality of coils to induce a fourth magnetic field to interact with the third magnetic field, wherein the fourth magnetic field substantially exhibits a fourth Halbach flux distribution; and
wherein the rotor is further adapted to rotate in response to interaction between the third and fourth magnetic fields.

10. An electric motor comprising:
a rotor;
means for providing a first magnetic field directed from a first side of the rotor, wherein the first magnetic field substantially exhibits a first Halbach flux distribution; and
means for selectively inducing a second magnetic field directed toward the first side of the rotor to interact with the first magnetic field, wherein the second magnetic field substantially exhibits a second Halbach flux distribution, wherein the rotor is adapted to rotate in response to interaction between the first and second magnetic fields.

11. The electric motor of claim 10, further comprising:
means for providing a third magnetic field directed from a second side of the rotor, wherein the third magnetic field substantially exhibits a third Halbach flux distribution;
means for selectively inducing a fourth magnetic field directed toward the second side of the rotor to interact with the third magnetic field, wherein the fourth magnetic field substantially exhibits a fourth Halbach flux distribution; and
wherein the rotor is further adapted to rotate in response to interaction between the third and fourth magnetic fields.

* * * * *